US012771465B2

(12) United States Patent
Niu et al.

(10) Patent No.: US 12,771,465 B2
(45) Date of Patent: Oct. 20, 2026

(54) METHOD OF LIFE CYCLE MANAGEMENT USING MODEL ID AND MODEL FUNCTION

(71) Applicant: Apple Inc., Cupertino, CA (US)

(72) Inventors: Huaning Niu, San Jose, CA (US); Wei Zeng, Saratoga, CA (US); Dawei Zhang, Saratoga, CA (US); Ankit Bhamri, Bad Nauheim (DE); Hong He, San Jose, CA (US); Sigen Ye, San Diego, CA (US); Oghenekome Oteri, San Diego, CA (US); Weidong Yang, San Diego, CA (US); Haitong Sun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 343 days.

(21) Appl. No.: 18/484,189

(22) Filed: Oct. 10, 2023

(65) Prior Publication Data

US 2024/0154709 A1 May 9, 2024

Related U.S. Application Data

(60) Provisional application No. 63/422,299, filed on Nov. 3, 2022.

(51) Int. Cl.
*H04B 17/382* (2015.01)
*H04B 17/391* (2015.01)
(Continued)

(52) U.S. Cl.
CPC ....... *H04B 17/382* (2015.01); *H04B 17/3913* (2015.01); *H04L 5/0048* (2013.01); *H04W 28/0215* (2013.01)

(58) Field of Classification Search
CPC ......................... H04B 17/382; H04B 17/3913; H04B 7/0626; H04L 5/0048; H04L 25/0254;
(Continued)

(56) References Cited

U.S. PATENT DOCUMENTS

2022/0182263 A1 6/2022 Kumar et al.
2022/0400373 A1* 12/2022 Zhu .......................... G06N 3/04
(Continued)

FOREIGN PATENT DOCUMENTS

WO WO 2022/015221 A1 1/2022

OTHER PUBLICATIONS

Qualcomm, "New SI: Study on Artificial Intelligence (AI)/Machine Learning (ML) for NR Air Interface," 3GPP TSG RAN meeting #94e, RP-213599, Electronic Meeting, Dec. 6-17, 2022, 6 pages.
(Continued)

*Primary Examiner* — Donald L Mills
(74) *Attorney, Agent, or Firm* — Sterne, Kessler, Goldstein & Fox P.L.L.C.

(57) ABSTRACT

Aspects are described for a user equipment (UE) comprising a transceiver configured to enable wireless communication with a base station, and a processor communicatively coupled to the transceiver. The processor is configured to receive a configuration message from the base station, wherein the configuration message indicates a model identifications (ID) and one or more signals and measure the one or more signals to generate a data set corresponding to the model ID. The processor is further configured to train a first artificial intelligence (AI) model corresponding to the model ID using the data set; generate a second data set corresponding the model ID; and transmit the second data set and the model ID to the base station. The second data set is used to train a second AI model corresponding to the model ID.

20 Claims, 9 Drawing Sheets

(51) Int. Cl.
*H04L 5/00* (2006.01)
*H04W 28/02* (2009.01)

(58) Field of Classification Search
CPC ... H04L 41/147; H04L 41/16; H04L 41/0806; H04W 28/0215; H04W 24/02; G06N 3/045
See application file for complete search history.

(56) References Cited

U.S. PATENT DOCUMENTS

| | | | | |
|---|---|---|---|---|
| 2024/0370760 | A1* | 11/2024 | Muhammad | G06N 20/00 |
| 2025/0192849 | A1* | 6/2025 | Wang | G06N 3/0455 |
| 2025/0227498 | A1* | 7/2025 | Echigo | H04L 41/16 |
| 2025/0379798 | A1* | 12/2025 | Sheng | G06N 20/00 |

OTHER PUBLICATIONS

"RAN1 Chair's Notes," 3GPP TSG RAN WG1 #110bis-e, e-Meeting, Oct. 10-19, 2022, 189 pages.

"Open Neural Network Exchange—The open standard for machine learning interoperability," printed Oct. 9, 2023 from https://onnx.ai/, Copyright 2019, 2 pages.

Dowling, J., "Guide to File Formats for Machine Learning: Columnar, Training, Inferencing, and the Feature Store," printed Oct. 9, 2023 from https://towardsdatascience.com/guide-to-file-formats-for-machine-learning-columnartraining-inferencing-and-the-feature-store-2e0c3d18d4f9, Oct. 25, 2019, 19 pages.

ZTE Corporation et al., "Initial Discussion on Use Cases for AI Study," R2-2210615, 3GPP TSG-RAN WG2 Meeting#119 bis, E-conference, Oct. 10-19, 2022; 12 pages.

Panasonic, "Discussion on AI/ML for CSI feedback enhancement," R1-2209161, 3GPP TSG RAN WG1 #110bis-e, E-conference, Oct. 10-19, 2022; 4 pages.

Apple, "Discussion on RAN2 aspects of AI/ML for air interface," R2-2209760, 3GPP TSG RAN WG2 Meeting #119b-e, E-conference, Oct. 10-19, 2022; 8 pages.

Vivo, "Discussions on AI/ML framework," R1-2208633, 3GPP TSG RAN WG1 #110bis-e, E-conference, Oct. 10-19, 2022; 36 pages.

Extended European Search Report for EP Application No. EP 20230207312.2, European Patent Office, Munich, Germany, dated Jun. 24, 2024; 16 pages.

ZTE Corporation, "Discussion on general aspects of common AI PHY framework," 3GPP TSG RAN WG1 #110bis-e, R1-2208520, Oct. 10, 2022; 9 pages.

* cited by examiner

METHOD OF LIFE CYCLE MANAGEMENT USING MODEL ID AND MODEL FUNCTION

CROSS-REFERENCE TO RELATED APPLICATIONS

The present application claims the benefit of U.S. Provisional Patent Application No. 63/422,299, filed on Nov. 3, 2022, which is herein incorporated by reference in its entirety.

BACKGROUND

Field

The described aspects generally relate to a life cycle management using model identifications (ID) and model function.

SUMMARY

Some aspects of this disclosure relate to systems, apparatuses, and methods for implementing a life cycle management using model ID and model function. For example, the systems, the apparatuses, and the methods are provided for receiving, training, and/or managing artificial intelligence (AI) functions and AI models.

Some aspects of this disclosure relate to a user equipment (UE) comprising a transceiver configured to enable wireless communication with a base station, and a processor communicatively coupled to the transceiver. The processor is configured to receive a configuration message from the base station, wherein the configuration message indicates a model ID and one or more signals and measure the one or more signals to generate a data set corresponding to the model ID. The processor is further configured to train a first AI model corresponding to the model ID using the data set; generate a second data set corresponding to the model ID; and transmit the second data set and the model ID to the base station. The second data set is used to train a second AI model corresponding to the model ID.

Some aspects of this disclosure relate to a method of operating a UE. The method comprises receiving a configuration message from a base station, wherein the configuration message indicates a ID and one or more signals and measuring the one or more signals to generate a data set corresponding to the model ID. The method further comprises training a first AI model corresponding to the model ID using the data set; generating a second data set corresponding to the model ID; and transmitting the second data set and the model ID to the base station. The second data set is used to train a second AI model corresponding to the model ID.

Some aspects of this disclosure relate to a UE comprising a transceiver configured to enable wireless communication with a base station, and a processor communicatively coupled to the transceiver. The processor is configured to transmit a capability report to the base station, wherein the capability report indicates one or more model functions. The processor is further configured to receive an activation message from the base station, wherein the activation message indicates a model function of the one or more model functions. The processor is further configured to select an AI model from one or more AI models corresponding to the model function and perform a task using the AI model.

This Summary is provided merely for the purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
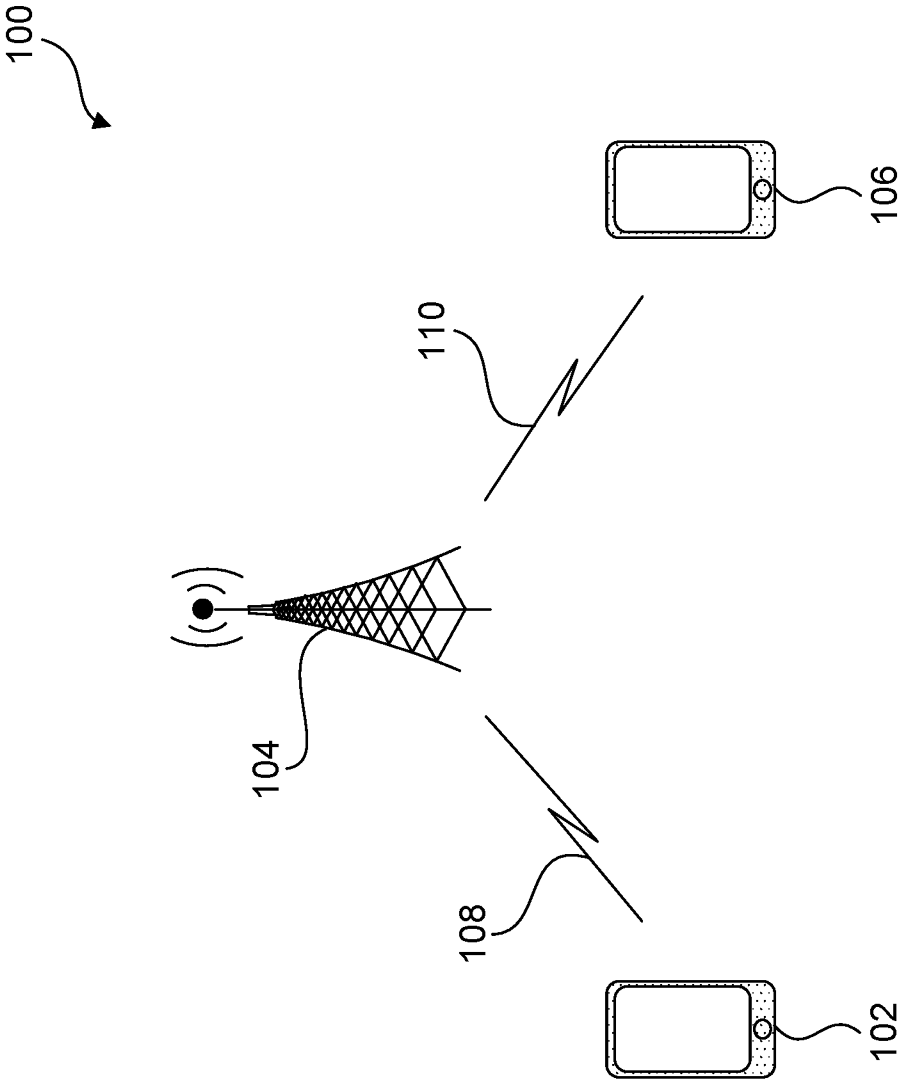
FIG. 1 illustrates an example system implementing a life cycle management using model ID and model function, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure relate to systems, apparatuses, and methods for implementing a life cycle management using model ID and model function, or AI function only. For example, the systems, the apparatuses, and the methods are provided for receiving, training, and/or managing AI models.

In some aspects, communication systems, such as wireless communication system, integrates AI to enhance system performance. Specifically, devices in a wireless communication network, such as UEs, base stations, and other network devices, can use AI models to improve network performance, optimize resource allocation, improve quality of service, enhance security, and so on. For example, UEs and base stations can use AI models to perform channel station information (CSI) compression. In some aspects, a UE can estimate and report CSI to a base station. The CSI provides crucial information about wireless channels between the UE and the base station, which includes signal quality, interference, fading, and other factors that affect the quality of communication. The base station can use the CSI to assign resource sources, perform beamforming, perform interference management, and so on. However, reporting the CSI requires resources and becomes challenging when the resources are limited and/or a large amount of data is needed to be transmitted. For example, the UE can include multiple antennas and thus a large amount of data is required to describe the channel conditions. For another example, the UE can have high mobility and thus is required to update the CSI frequently. In either case, the UE can use an AI model to encode and/or compress the CSI and transmit the compressed data to the base station. The base station can decompress the compressed data using the AI model to obtain the CSI. In such a case, the amount of data required to be transmitted is reduced to improve the wireless communication efficiency and reliability.

In some aspects, the wireless communication network can use two-sided models and/or one-sided models. Here, the CSI compression uses a two-sided model because it requires using the AI model in both the UE and the base station. In such a case, the two-sided model includes a first part of an AI model that is used by the UE and a second part of the AI model that is used by the base station. In some aspects, a two-sided model can be trained by one side or by two sides. For example, the two-sided model can be trained at the base station. The base station can train the first part and the second part of the AI model locally or via other devices of a network that the base station belongs to. The base station can then transmit the first part of the AI model to the UE so that the UE can use the first part of the AI model. Similarly, the two-sided model can be trained at the UE and the UE can transmit the second part of the AI model to the base station. On the other hand, the first part and the second part of the AI model can be trained at the UE and at the base station, respectively. In such a case, no model transfer is required. However, training data may still need to be transferred between the UE and the base station. For example, the UE may measure signals received from the base station to generate training data and transmit the training data to the base station so that the base station can train the second part of the AI model. In some aspects, both the UE and the base station need to identify AI models and training data that are transmitted and received. For example, the AI model can be a CSI compression model. Thus, to use the CSI compression model, the UE and the base station need to activate the first part of the AI model and the second part of the AI model respectively. In order for the UE and the base station to act together, the UE and the base station need to identify the CSI compression model. For example, the UE and the base station can identify the CSI compression model using a model ID. In such a case, when the base station trains the first part of the AI model and transmits it to the UE, the base station can also transmit a model ID corresponding to the first part of the AI model along with the first part of the AI model. In some aspects, similar to the AI models, the UE and the base station can also identify training data using data ID. For example, when the UE transmits the training data to the base station, the UE can also transmit a data ID along with the training data to the base station. In some aspects, the data ID of the training data can be a model ID of the AI model training using the training data. For example, the data ID of the training data used to train the AI model can be the model ID of the AI model.

In some aspects, one-sided models can be used by either the UE or the base station. For example, the UE can perform CSI prediction using a CSI prediction model. The CSI prediction model can be trained by the UE or the base station. For example, the UE can train the CSI prediction model because the UE can generate most recent training data to train the CSI prediction model. In such a case, the UE can perform inferencing using the UE trained model. In some aspects, the base station can also train the CSI prediction model, and transfer the model to the UE for inferencing. In such a case, the UE can use the AI model to predict CSI. When model transfer is used, similar to the two-sided models, the one-sided models can also be identified by their respective model IDs. In some aspects, for one-sided model without model transfer, the life cycle management can be based on model functions. For example, a model function refers to a type of AI model(s) to be used by the UE and the UE can select and activate an AI model of the type to use. In some aspects, the model function defines AI model(s) by their function. For example, AI models of a CSI prediction model function can be used to predict CSI.

In some aspects, the UE and the base station can be configured with a plurality of AI models. For example, the UE and the base station can be configured with three AI models to perform CSI compression for three different scenarios: an indoor scenario, an outdoor scenario, and a rural scenario. The UE and the base station can activate one out of the three AI models depending on a current scenario. In some aspects, the base station can determine which AI model to activate. For example, the base station determines to activate an AI model with the indoor scenario. In such a case, the base station can transmit an activation message to the UE. The activation message can indicate the AI model with the indoor scenario using a model ID. In some aspects, the UE can determine which AI model to activate. In such a case, the UE can transmit a request message indicating a model ID of the AI model to be activated. The UE can then receive an activation message confirming the model ID from the base station to activate the AI model.

In summary, preparing, training, and managing AI models used in the wireless communication network can require coordination among various devices, such as UEs, base stations, and other devices. Such coordination can be better served by labeling AI models and training data using their respective model IDs.

FIG. 1 illustrates an example system 100 implementing a life cycle management using model ID and model function, according to some aspects of the disclosure. The example system 100 is provided for the purpose of illustration only and does not limit the disclosed aspects. The example system 100 may include, but is not limited to, a UE 102, a UE 106, and a base station 104. The UEs 102 and 106 may be implemented as electronic devices configured to operate based on a wide variety of wireless communication techniques. These techniques may include, but are not limited to, techniques based on 3rd Generation Partnership Project (3GPP) standards. For example, the UEs 102 and 106 be configured to operate using one or more 3GPP releases, such as Release 15 (Rel-15), Release 16 (Rel-16), Release 17 (Rel-17), Release 18 (Rel-18), or other 3GPP releases. The UEs 102 and 106 may include, but is not limited to, wireless communication devices, smartphones, laptops, desktops, tablets, personal assistants, monitors, televisions, wearable devices, Internet of Things (IoT) devices, vehicle communication devices, and the like. The base station 104 may include one or more nodes configured to operate based on a wide variety of wireless communication techniques such as, but not limited to, techniques based on the 3GPP standards. For example, the base station 104 may include nodes configured to operate using Rel-15, Rel-16, Rel-17, Rel-18, or other 3GPP releases. The base station 104 may include, but not limited to, NodeBs, eNodeBs, gNBs, new radio base stations (NR BSs), access points (APs), remote radio heads, relay stations, and others.

In some aspects, the UE 102 connects with the base station 104 via a communication link 108. The communication link 108 can include uplink (UL) connections and downlink (DL) connections. In some aspects, the UE 102 and the base station 104 can use AI models to enhance the communication between them. For example, the UE 102 and the base station 104 can use an AI model to perform CSI compression. Specifically, the UE 102 can use a first part of a CSI compression AI model to compress the CSI to be reported to the base station 104. The base station 104 can use a second part of the CSI compression AI model to decompress the CSI received from the UE 102. In this way, CSI reporting between the UE 102 and the base station 104 can be more efficient and thus improve the communication between the UE 102 and the base station 104.

In some aspects, the AI model, such as the CSI compression AI model, can be a two-sided AI model because both the UE 102 and the base station 104 use the AI model. In some aspects, the two-sided AI model can be trained in both the UE 102 and the base station 104. For example, the UE 102 can train a first part of the AI model and the base station 104 can train a second part of the AI model. For the UE 102 and base station 104 to coordinate in training the first part and the second part of the AI model, a model ID can be used. For example, the base station 104 or the UE 102 can label the AI model with the model ID. In such a case, the base station 104 can notify the UE 102 that the base station 104 trains the second part of the AI model. Similarly, the UE 102 can notify the base station 104 that the UE 102 trains the first part of the AI model.

In some aspects, training data need to be transferred between the UE 102 and the base station 104. For example, the base station 104 can notify the UE 102 to train the AI model and to collect training data to be used to train the AI model. The base station 104 can transmit a configuration message to the UE 102 to indicate a model ID of the AI model. The UE 102 can then generate a first training data set and train the first part of the AI model using the first training data set. The UE 102 can also generate a second training data set to be used to train the second part of the AI model. The UE 102 can label the second training data set with the model ID and transmit the second training data set to the base station 104. Finally, the base station 104 can train the second part of the AI model using the second training data set. In some aspects, the base station 104 can also collect training data from the UE 106 via a communication link 110. For example, the base station can configure the UE 106 to collect a third training data set. The third training data set can also be used to train the AI model. To distinguish the second and the third training data sets, the base station 104 can label them using different model IDs. For example, the base station 104 can generate a master model ID, a first sub-model ID, and a second sub-model ID. The master model ID corresponds to the AI model. Furthermore, the first and the second sub-model IDs are associated with the master model ID. In such a case, the base station 104 can transmit the first sub-model ID to the UE 102 and transmit the second sub-model ID to the UE 106. Thus, the UE 102 can label the second training data set using the first sub-model ID and the UE 106 can label the third training data set using the second sub-model ID. When receiving the second and the third training data sets, the base station 104 can determine that they are used to train the AI model because both the first sub-model ID and the second sub-model ID are associated with the master model ID. The base station 104 can also distinguish the second and the third training data sets using their respective sub-model IDs.

In some aspects, the base station 104 can activate and deactivate an AI model using the model ID. For example, the base station 104 can transmit an activation message to the UE 102 indicating the model ID. The UE 102 can then activate the first part of the AI model. In case that sub-model IDs are used, the activation message can indicate the first sub-model ID so that the UE 102 can activate the first part of the AI model. The base station 104 can also deactivate the first part of the AI model similarly using the model ID or the first sub-model ID.

In some aspects, the UE 102 or the base station 104 can also use one-sided AI models, such as CSI prediction AI models and others. In some aspects, a one-sided AI model is performed by either the UE 102 or the base station 104, but not both. For example, a one-side AI model can be trained by the base station 104 and used by the UE 102. The base station 104 can perform a model transfer to transmit the one-sided AI model to the UE 102. The base station 104 can also label the one-side AI model using a model ID. Specifically, the base station 104 can transmit the one-sided AI model together with the model ID to the UE 102. In such a case, the base station 104 can later activate and deactivate the one-sided AI model using the model ID. For example, the base station 104 can transmit an activation message indicating the model ID to the UE 102. The UE 102 can then activate the one-side AI model based on the activation message.

Figure 2:
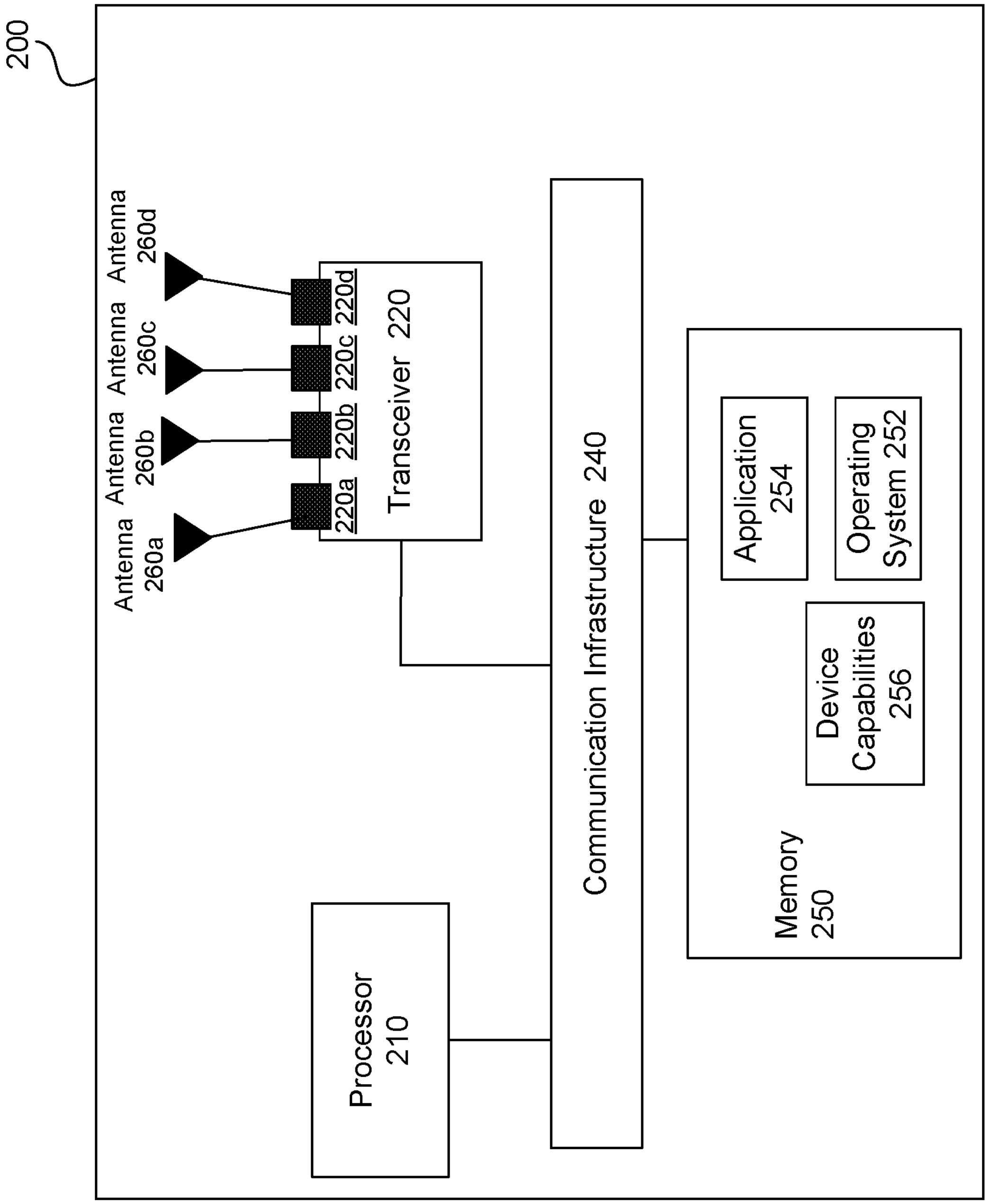
FIG. 2 illustrates a block diagram of an example system of an electronic device for the life cycle management using model ID and model function, according to some aspects of the disclosure.

FIG. 2 illustrates a block diagram of an electronic device 200 implementing the life cycle management using model ID and model function, according to some aspects of the disclosure. The electronic device 200 may be any of the electronic devices (e.g., the UE 102, the base station 104, and the UE 106) of the system 100. The electronic device 200 includes a processor 210, one or more transceivers 220, a communication infrastructure 240, a memory 250, an operating system 252, an application 254, device capabilities 256, and antennas 260*a*, 260*b*, 260*c*, and 260*d*. Illustrated systems are provided as exemplary parts of electronic device 200, and electronic device 200 may include other circuit(s) and subsystem(s). Also, although the systems of electronic device 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by the electronic device 200 and/or a user of the electronic device 200. The applications in the application 254 may include applications such as, but not limited to, radio streaming, video streaming, remote control, and/or other user applications. In some aspects, the device capabilities 256 may be stored in the memory 250.

The electronic device 200 may also include the communication infrastructure 240. The communication infrastructure 240 provides communication between, for example, the processor 210, the one or more transceivers 220, and the memory 250. In some implementations, the communication infrastructure 240 may be a bus.

The processor 210, alone, or together with instructions stored in the memory 250 performs operations enabling electronic device 200 of the system 100 to implement mechanisms for the life cycle management using model ID and model function, as described herein. Alternatively, or additionally, the processor 210 can be "hard coded" to implement mechanisms for the life cycle management using model ID and model function, as described herein.

The one or more transceivers 220 transmit and receive communications signals supporting mechanisms for the life cycle management using model ID and model function. Additionally, the one or more transceivers 220 transmit and receive communications signals that support mechanisms for measuring communication link(s), generating and transmitting system information, and receiving the system information. According to some aspects, the one or more transceivers 220 may include transceivers 220*a*, 220*b*, 220*c*, and 220*d* that are coupled to the antennas 260*a*, 260*b*, 260*c*, and 260*d* respectively to wirelessly transmit and receive the communication signals. In some aspects, the one or more transceivers 220 may form one or more receiving chains. For example, the transceiver 220*a* (having a first receiver) and the antenna 260*a* can form a first receiving chain. The transceiver 220*b* (having a second receiver) and the antenna 260*b* can form a second receiving chain. The antennas 260*a*, 260*b*, 260*c*, and 260*d* may include one or more antennas that may be the same or different types and can form one or more antenna ports. The one or more transceivers 220 allow electronic device 200 to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks. In some aspects, the one or more transceivers include a single transceiver 220*a* coupled to a single antenna 260*a*.

According to some aspects of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

Additionally, the one or more the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the one or more transceivers 220 may be configured to operate according to one or more of Rel-15, Rel-16, Rel-17, Rel-18, or other releases of 3GPP standard.

As discussed in more detail below with respect to FIGS. 3-9, processor 210 may implement different mechanisms for the life cycle management using model ID and model function as discussed with respect to the system 100 of FIG. 1.

Figure 3:
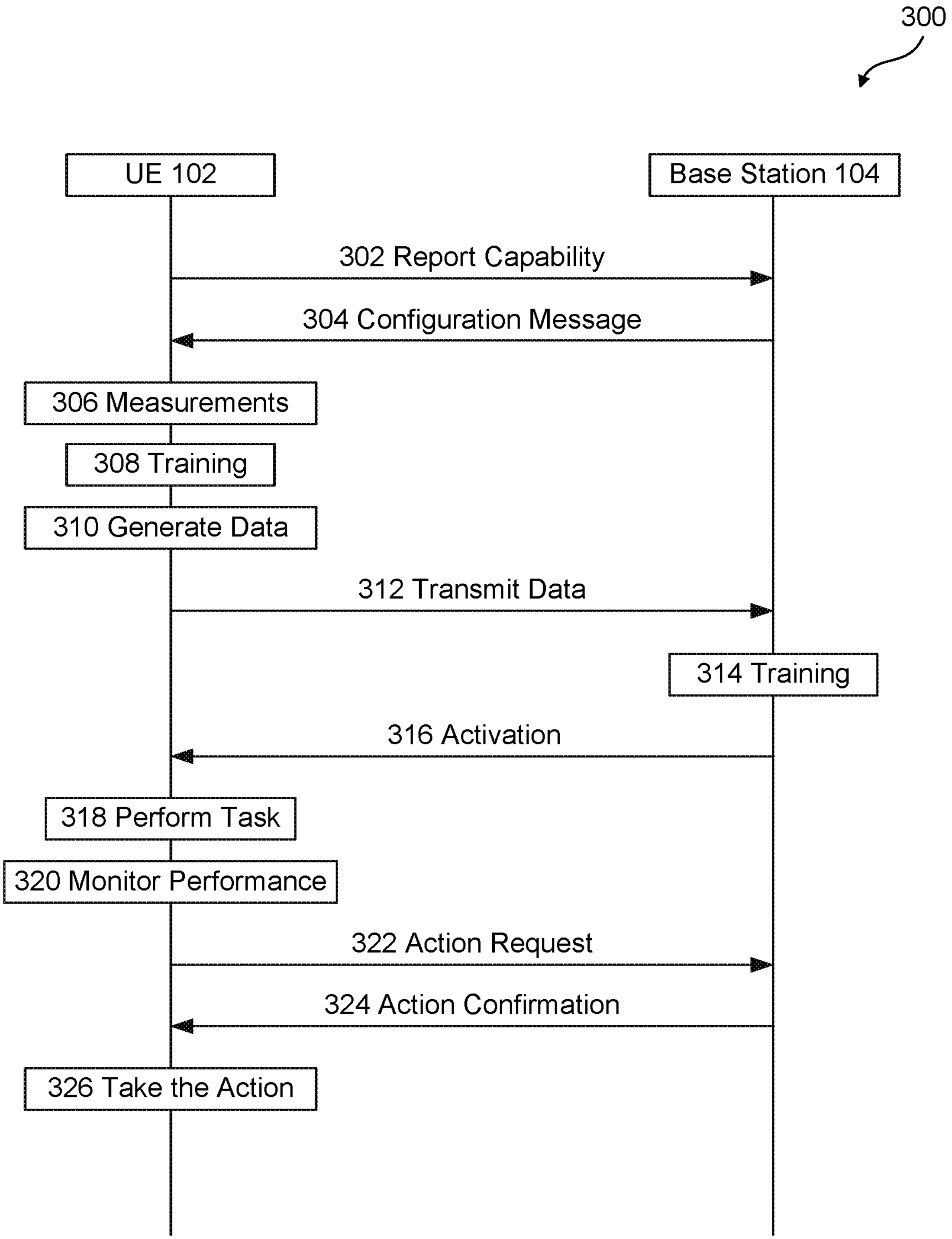
FIG. 3 illustrates an example method of training a two-sided AI model at both a user equipment (UE) and a base station, according to aspects of the disclosure.

FIG. 3 illustrates an example method 300 of training a two-sided AI model at both a UE and a base station, according to aspects of the disclosure. The example method 300 is provided for the purpose of illustration only and does not limit the disclosed aspects. As a convenience and not a limitation, FIG. 3 may be described with regard to elements of FIGS. 1, 2, and 9. The example method 300 may represent the operation of electronic devices (for example, the UEs 102, 106, and the base station 104 of FIG. 1) implementing the life cycle management using model ID and model function. The example method 300 may also be performed by the electronic device 200 of FIG. 2, controlled or implemented by processor 210, and/or computer system 900 of FIG. 9. But the example method 300 is not limited to the specific aspects depicted in those figures and other systems may be used to perform the method, as will be understood by those skilled in the art. It is to be appreciated that not all operations may be needed, and the operations may not be performed in the same order as shown in FIG. 3.

At 302, the UE 102 reports its capability to the base station 104. In some aspects, the capability indicates AI models supported by the UE 102. For example, the capability can indicate types of AI models supported by the UE 102. The types of AI models can include CSI compression AI models, CSI prediction AI models, beam management AI models, and other models. In some aspects, each type of the AI model may include various scenarios. For example, the CSI compression AI models can include indoor CSI compression AI models, outdoor CSI compression AI models, and other CSI compression AI models. The capability can also indicate structures and layers of AI models supported by the UE 102.

At 304, the base station 104 can generate and transmit a configuration message to the UE 102. In some aspects, the base station 104 can transmit the configuration message via radio resource control (RRC) signaling or user data plane. The configuration message can indicate at least a model ID and one or more signals. In some aspects, the model ID corresponds to a model function, such as a CSI compression AI model function. The configuration message can further indicate the model function. The one or more signals can be CSI-RS transmitted by the base station 104 or other signals. In some aspects, the base station 104 can generate the model ID and include it in the configuration message.

At 306, the UE 102 can measure the one or more signals to generate a first training data set. For example, the UE 102 can measure CSI-RS received from the base station 104 to generate the first training data set. The UE 102 may also label the first training data set using the model ID received in the configuration message.

At 308, the UE 102 can train an AI model using the first training data set. For example, the model ID corresponds to the two-sided AI model. The two-sided AI model can include a first part and a second part trained and used by the UE 102 and the base station 104 respectively. Here, the UE 102 can train the first part of the two-sided AI model using the first training data set. Note that UE 102 can associate the first part of the two-sided AI model and the first training data set with each other using the model ID.

At 310, the UE can generate a second training data set. The second training data set can be based on the first training data set. In addition, the second training data set can be generated by the first part of the two-sided AI model. For example, the second training data set can be outputs of the first part of the two-sided AI model. The second training data set can be used to train the second part of the two-sided AI model.

At 312, the UE 102 transmits the second training data set to the base station 104. In some aspects, the UE 102 can label the second training data set using the model ID. For example, the UE 102 can transmit the second training data set along with the model ID to the base station 104. In such a case, the base station 104 can determine that the second training data set is to be used to train the second part of the two-sided AI model indicated by the model ID.

At 314, the base station 104 trains the second part of the two-sided AI model using the second training data set. In some aspects, the base station 104 is aware that the two-sided AI model includes the first and the second part when generating the configuration message 304. The base station 104 is also aware that the UE 102 trains the first part of the two-sided AI model and the base station 104 trains the second part of the two-sided AI model.

In some aspects, the two-sided AI model can be trained joined by the UE 102 and base station 104 in iterations. For example, forward propagations and backward propagations of the first and the second parts of the two-sided AI model are trained in a same loop. Specifically, after training the second part of the two-sided AI model at 314, the base station 104 can generate an updated first training data set and transmit it to the UE 102. The UE 102 can update the first part of the two-sided AI model using the updated first training data set. The UE 102 can then generate an updated second training data set using the updated first part of the two-sided AI model and transmit the updated second training data set to the base station 104. Subsequently, the base station 104 can update the second part of the two-sided AI model using the updated second training data set. This iteration can go on until a predetermined number of iterations is reached or a performance threshold is satisfied. The performance of the two-sided AI model can be verified using test data sets that are pre-generated. After the iteration stops and the joint training completes, the control moves to 316.

At 316, the base station 104 generates and transmits an activation message to the UE 102. In some aspects, the activation message indicates the model ID corresponding to the two-sided AI model that was trained.

At 318, the UE 102 determines that the activation message indicates to activate the first part of the two-sided AI model based on the model ID. Thus, the UE 102 performs a task using the first part of the two-sided AI model. For example, the two-sided AI model can be a CSI compression AI model. In such a case, the UE 102 can encode and/or compress CSI using the first part of the two-sided AI model.

In some aspects, the UE 102 can transmit the compressed data to the base station 104, which can decompress the compressed data using the second part of the two-sided AI model. The base station 104 can then use the CSI to adjust configurations. For example, the base station 104 can reconfigure resources of the UE 102 based on the CSI. The base station 104 can also initiate a handover process based on the CSI. In some aspects, the two-sided AI model can be other types of AI models and thus the task can include other types of tasks. In addition, the activation message may indicate other AI models, such as CSI prediction AI models and beam management AI models. In such a case, the UE 102 can perform CSI prediction or beam management at 318.

In some aspects, the UE 102 can activate the first part of the two-sided AI model autonomously without or regardless of instructions from the base station 104. For example, the base station 104 may refrain from transmitting the activation message. In such a case, the UE 102 can determine by itself to activate the first part of the two-side AI model. The UE 102 can determine based on an environment of the UE 102. For example, the UE 102 can determine that it is located in an indoor environment and the two-side AI model is associated with the indoor environment. In such a case, the UE 102 can determine to activate the first part of the two-side AI model. For another example, the activation message may indicate an AI model that is not suitable for the UE 102. For example, the AI model indicated by the activation message may be associated with an outdoor environment, but the UE 102 is located indoors. In such a case, the UE 102 can disregard the activation message and select the two-side AI model instead.

At 320, the UE can monitor performance. For example, the UE 102 can monitor a signal quality of signals received from the base station 104. For example, the signal quality can include a signal-to-noise ratio (SNR), a signal strength, a bit error rate (BER), a latency value, and so on. In some aspects, the signal quality reported in the CSI varies based on the two-sided AI model used. For example, the two-sided AI model may cause errors when compressing and/or decompressing the CSI. In such a case, the base station 104 may configure the resources of the UE 102 based on inaccurate CSI. As a result, the communication between the UE 102 and the base station 104 may experience performance degradation, such as reduced signal strengths, SNR, and so on. In some aspects, the two-sided AI model may be outdated. Thus, the UE 102 and the base station 104 can retrain or update the two-sided AI model. In other aspects, an environment of the UE 102 may have changed. For example, the UE 102 may move from an indoor environment to an outdoor environment. The two-sided model configured and activated may be associated with an indoor environment. In such a case, the two-sided AI model may perform poorly and cause errors. In any case, when the UE 102 determines that the signal quality is below a predetermined threshold, the control moves to 322.

In some aspects, the base station 104 can also monitor the performance similarly to the UE 102. In such a case, step 322 can be skipped.

At 322, the UE 102 generates and transmits an action request to the base station 104. In some aspects, the UE 102 can transmit the action request via a unified air interface (UAI) or MAC Control Element (MAC CE). The action request can indicate or request a change to a second AI model. For example, the second AI model may be associated with the outdoor environment that the UE 102 is currently located in. The action request can include a model ID of the second AI model. In some aspects, the action request may report the signal quality or indicate that the signal quality is below the predetermined threshold without indicating any AI models. In such a case, the base station 104 can select an AI model.

At 324, the base station 104 generates and transmits an action confirmation to the UE 102. In case that the action request indicates a change to the second AI model, the action confirmation can indicate deactivating the current two-sided AI model and/or switching to the second AI model. In some aspects, instead of indicating switching to the second AI model, the action confirmation can indicate switching to other AI models. For example, the base station 104 may determine that the second AI model proposed by the UE 102 does not fit an environment of the UE 102. In some aspects, the action confirmation can also configure the UE 102 to fall back to a default method. The default method may include methods without using AI models. For example, the UE 102 can quantize the CSI to a limited set of discrete values to reduce a number of bits required to represent the CSI. For another example, the UE 102 can apply principal component analysis (PCA) to reduce dimensionality of the CSI so that fewer data are to be transmitted.

In case that the action request does not indicate any AI models, the action confirmation can also indicate deactivating the current two-sided AI model, switching to the second AI model, and/or falling back to a default method. Here, the base station 104 may determine that the second AI model is suitable for the environment of the UE 102.

At 326, the UE 102 takes an action based on the action confirmation. The action includes, but is not limited to, deactivating the current two-sided AI model, switching to another AI model, such as the second AI model, and/or falling back to a default method. In some aspects, after switching to the other AI model, the control moves back to 318 and the UE performs the task using the newly activated AI model. In some aspects, the UE 102 can take an action autonomously without instructions from the base station 104. For example, the UE 102 can determine that the current two-sided model causes the performance degradation and is no longer suitable for the UE 102. The UE 102 can further select an AI model that is suitable and switch to the selected AI model.

In some aspects, the UE 102 and the base station 104 can update an AI model. For example, when the UE 102 or the base station 104 determines a performance degradation at the step 320, the UE can update the first training data set and retrain or update the first part of the two-sided AI model using the updated first training data set. The UE 102 can then generate and transmit an updated second training data set to the base station 104. The base station can retrain or update the second part of the two-sided AI model. In some aspects, model IDs include a version number. Thus, the base station 104 can update the model ID of the two-sided AI model after the base station 104 retrains or updates the two-sided AI model. For example, the version number of the model ID may increase by 1. The base station 104 can also notify the UE 102 with the updated model ID.

Figure 4:
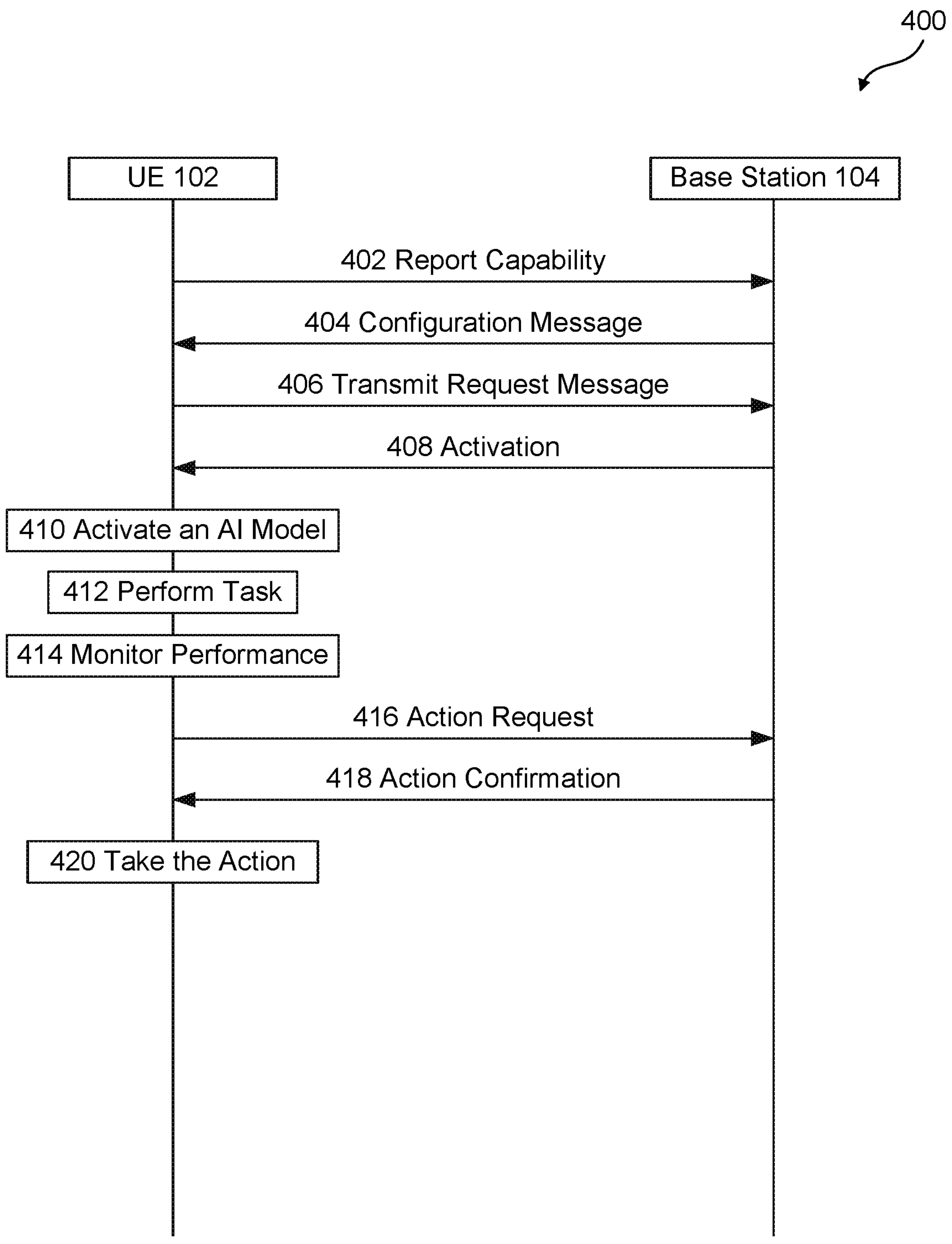
FIG. 4 illustrates an example method of training a two-sided AI model at a base station, according to aspects of the disclosure.

FIG. 4 illustrates an example method 400 of training a two-sided AI model at a base station, according to aspects of the disclosure. The example method 400 is provided for the purpose of illustration only and does not limit the disclosed aspects. As a convenience and not a limitation, FIG. 4 may be described with regard to elements of FIGS. 1, 2, and 9. The example method 400 may represent the operation of electronic devices (for example, the UEs 102, 106, and the base station 104 of FIG. 1) implementing the life cycle management using model ID and model function.

At 402, the UE 102 reports capability to the base station 104. In some aspects, the capability indicates AI models supported by the UE 102. For example, the capability can indicate types of AI models supported by the UE 102. The types of AI models can include CSI compression AI models, CSI prediction AI models, beam management AI models, and other models. In some aspects, each type of the AI model may include various scenarios. For example, the CSI compression AI models can include indoor CSI compression AI models, outdoor CSI compression AI models, and other CSI compression AI models. The capability can also indicate structures and layers of AI models supported by the UE 102.

At 404, the base station 104 transmits a configuration message to the UE 102. The configuration message can include one or more AI models and one or more model IDs corresponding to the one or more AI models. In some aspects, the base station 104 can transmit the configuration message via RRC signaling or user data plane. In some aspects, the one or more AI models may be two-sided AI models that each includes two parts. For example, the one or more AI models include a CSI compression AI model, which includes a first part and a second part. In some aspects, the base station 104 can train the first part and the second part of the CSI compression AI model. The base station 104 can also receive the first part and the second part of the CSI compression AI model from other devices of a network to which the UE 102 and the base station 104 belong. In some aspects, the capability can indicate the one or more AI models. In some aspects, the base station 104 can generate the one or more model IDs and include them in the configuration message to indicate the respective one or more AI models. In some aspects, the configuration message can also indicate model functions of the one or more AI models. For example, the one or more AI models corresponds to a CSI compression model function because they are CSI compression AI models. In such a case, the configuration message can indicate the CSI compression model function.

At 406, the UE 102 can transmit a request message to the base station 104. In some aspects, the UE 102 can transmit the request message via UCI signaling. The request message can indicate a model ID of an AI model of the one or more AI models. For example, the request message can indicate a model ID of the CSI compression AI model. In this way, the UE 102 proactively requests activating a particular AI model using the corresponding model ID, such as the CSI compression AI model. In some aspects, the UE 102 may request without indicating an AI model. For example, the request message may indicate a type of AI model, such as AI models for CSI compression. In some aspects, the one or more AI models may include one or more AI models that can be used for CSI compression. In such a case, the base station 104 can select an AI model out of the one or more AI models.

At 408, the base station 104 can transmit an activation message to the UE 102. The activation message can indicate the model ID of the corresponding AI model that the base station 104 wants the UE 102 to activate, such as the model ID of the CSI compression AI model. When the request message of the step 406 indicates a model ID, the activation message can indicate the same model ID. When the request message of the step 406 does not indicate a model ID, the activation message can indicate a model ID selected by the base station 104 as discussed above. In some aspects, the activation message can also indicate a model ID that is different from the model ID indicated in the request message. In such a case, the base station 104 overwrites the model ID requested by the UE 102. Specifically, base station 104 may determine that the model ID requested by the UE 102 is not suitable for a situation of the UE 102. For example, the UE 102 may be in an indoor environment, but the AI model corresponding to the model ID indicated by the request message is designed to be used in an outdoor environment. In such a case, the base station 104 configures the activation message to indicate an AI model that is suitable for the indoor environment.

At 410, the UE 102 activates an AI model based on the activation message. For example, the activation message indicates a model ID that corresponds to an AI model of the one or more AI models received at step 404. Thus, the UE 102 can activate the AI model based on the model ID. In some aspects, the UE 102 can activate an AI model autonomously without instruction from the base station 104 as discussed above.

At 412, the UE 102 performs a task using the AI model. For example, the AI model can be a CSI compression AI model. In such a case, the UE 102 can perform CSI compression using the AI model. Similarly, the UE 102 can perform other tasks, such as CSI prediction and beam management, when the AI model is of other types.

At 414, the UE 102 can monitor performance similarly as discussed in step 320 of FIG. 3. Subsequently, at steps 416, 418, and 420, the UE 102 can transmit an action request, receive an action confirmation, and take an action similarly as discussed in steps 322, 324, and 326 of FIG. 3 respectively.

In some aspects, the base station 104 can update an AI model. For example, when the UE 102 or the base station 104 determines a performance degradation at the step 414, the base station 104 can retrain or update the AI model. In some aspects, model IDs include a version number. Thus, the base station 104 can update the model ID of the AI model after the base station 104 retrains or updates the AI model. For example, the version number of the model ID may increase by 1. The base station 104 can also notify the UE 102 with the updated model ID.

Figure 5:
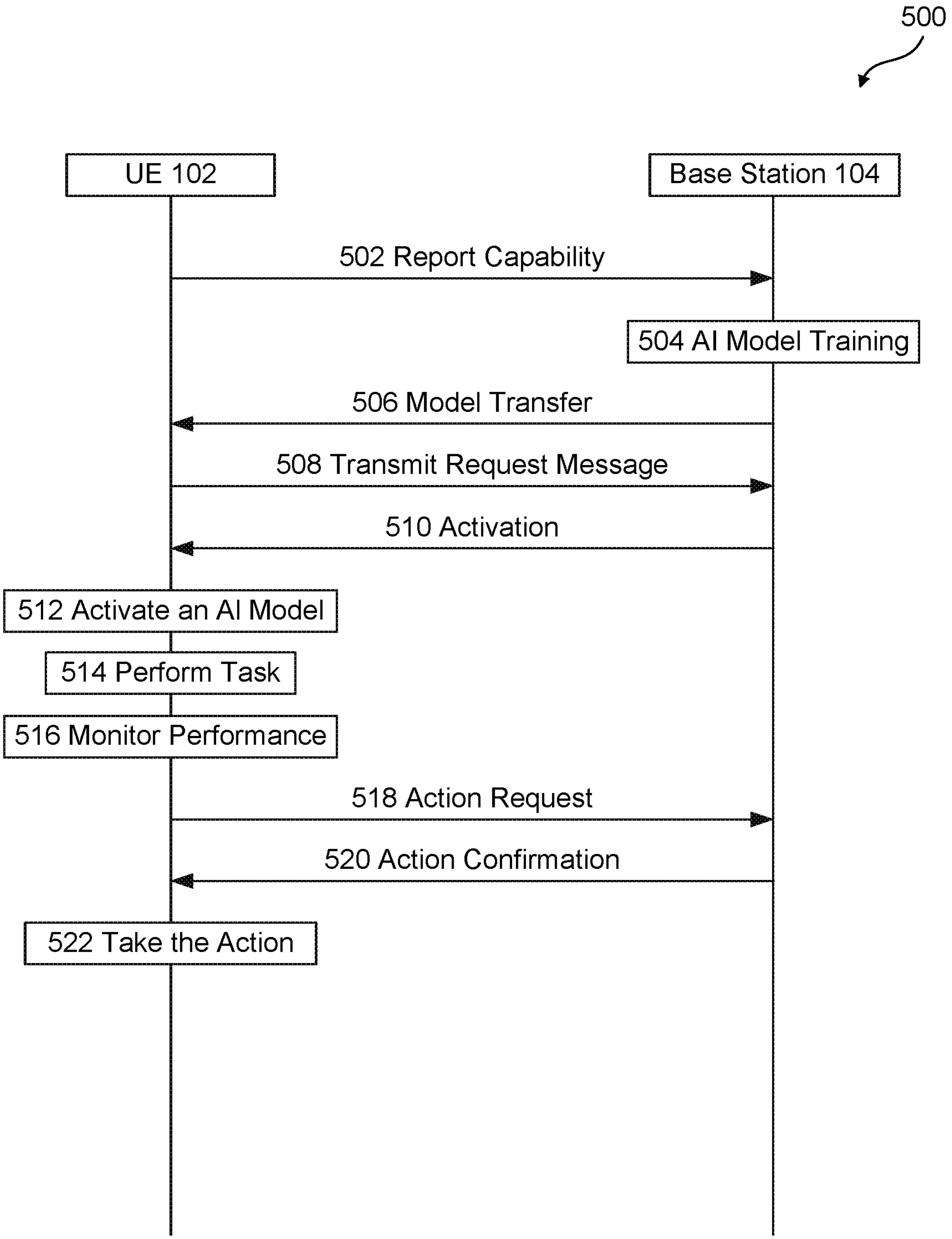
FIG. 5 illustrates an example method of training a one-sided AI model with a model transfer, according to aspects of the disclosure.

FIG. 5 illustrates an example method 500 of training a one-sided AI model with a model transfer, according to aspects of the disclosure. The example method 500 is provided for the purpose of illustration only and does not limit the disclosed aspects. As a convenience and not a limitation, FIG. 5 may be described with regard to elements of FIGS. 1, 2, and 9. The example method 500 may represent the operation of electronic devices (for example, the UEs 102, 106, and the base station 104 of FIG. 1) implementing the life cycle management using model ID and model function.

At 502, the UE 102 reports capability to the base station 104. In some aspects, the capability indicates AI models supported by the UE 102. For example, the capability can indicate types of AI models supported by the UE 102. The types of AI models can include one-sided AI models such as CSI prediction AI models, beam management AI models, and other models. In some aspects, each type of the AI model may include various scenarios. For example, the CSI prediction AI models can include indoor CSI prediction AI models, outdoor CSI prediction AI models, and other CSI prediction AI models. The capability can also indicate structures and layers of AI models supported by the UE 102.

At 504, the base station 104 trains one or more AI models. In some aspects, the capability reported by the UE 102 indicates the one or more AI models.

At 506, the base station 104 transmits the one or more AI models to the UE 102 via a model transfer. For example, the base station 104 can transmit a configuration message to the UE 102. In some aspects, the base station 104 can transmit the configuration message via RRC signaling or user data plane. The configuration message can include the one or more AI models and one or more model IDs corresponding to the one or more AI models. In some aspects, the base station 104 can generate the one or more model IDs and include them in the configuration message.

At 508, the UE 102 transmits a request message to the base station 104. In some aspects, the UE 102 can transmit the request message via UCI signaling. The request message can indicate a model ID of an AI model of the one or more AI models that the UE wants to utilize. For example, the request message can indicate a model ID of a particular signal processing AI model. In this way, the UE 102 proactively requests activating a particular AI model, such as the signal processing AI model. In some aspects, the UE 102 may request without indicating an AI model. For example, the request message may indicate a type of AI model, such as AI models for signal processing. In some aspects, the one or more AI models may include one or more AI models that can be used for signal processing. In such a case, the base station 104 can select an AI model out of the one or more AI models.

At 510, the base station 104 generates and transmits an activation message to the UE 102. The activation message can indicate the model ID, such as the model ID of the signal processing AI model. When the request message of the step 508 indicates a model ID, the activation message can indicate the same model ID. When the request message of the step 508 does not indicate a model ID, the activation message can indicate a model ID selected by the base station 104 as discussed above. In some aspects, the activation message can also indicate a model ID that is different from the model ID indicated in the request message. In such a case, the base station 104 overwrites the model ID requested by the UE 102. Specifically, base station 104 may determine that the model ID requested by the UE 102 is not suitable for a situation of the UE 102.

At steps 512, 514, 516, 518, 520, and 522, the UE 102 and the base station 104 operate similarly as discussed in respective steps 410, 412, 414, 416, 418, and 420 of FIG. 4. However, unlike the steps 410, 412, 414, 416, 418, and 420 of FIG. 4, where the UE 102 operates based on a two-sided AI model, the UE 102 operates based on a one-sided model at the steps 512, 514, 516, 518, 520, and 522.

In some aspects, the one or more AI models can be trained by the UE 102 and used by the base station 104. For example, the one or more AI models can be CSI prediction AI models or beam management AI models. The steps of the life cycle management are similar to the discussion above, but the UE 102 and the base station 104 switch roles. Specifically, the UE 102 trains the one or more AI models and the UE 102 transmits the one or more AI models to the base station 104. Subsequently, the base station 104 can activate an AI model and perform a task. The UE 102 can still monitor performance and transmit the action request to deactivate and/or switch an AI model. The base station 104 can take an action directly without communicating back to the UE 102 after receiving the action request from the UE 102.

In some aspects, the UE 102 or the base station 104 can also update an AI model and its corresponding model ID as similarly discussed above.

Figure 6:
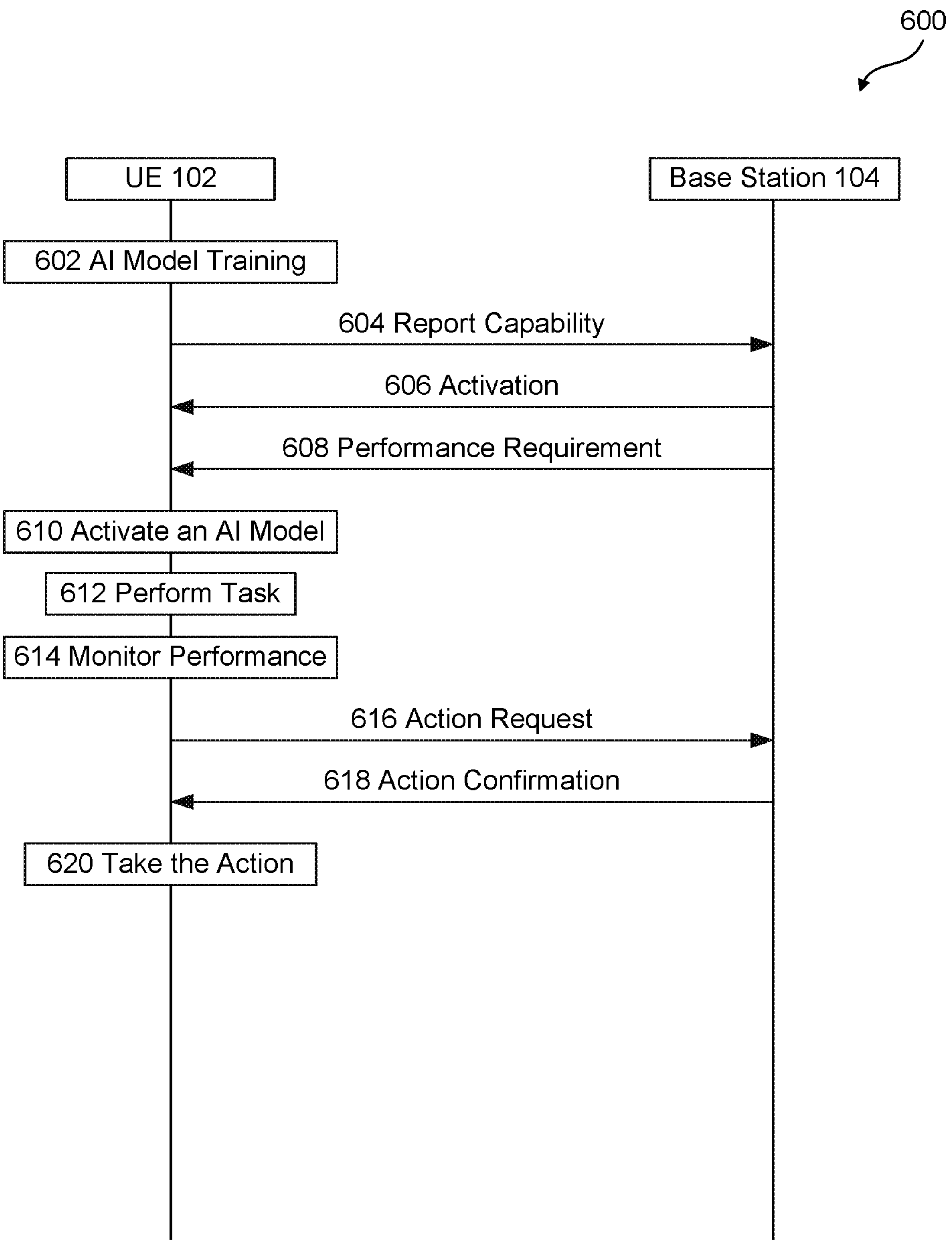
FIG. 6 illustrates an example method of a life cycle management for a one-sided AI model without a model transfer using model functions, according to aspects of the disclosure.

FIG. 6 illustrates an example method 600 of training a one-sided AI model without a model transfer using model functions, according to aspects of the disclosure. The example method 600 is provided for the purpose of illustration only and does not limit the disclosed aspects. As a convenience and not a limitation, FIG. 6 may be described with regard to elements of FIGS. 1, 2, and 9. The example method 600 may represent the operation of electronic devices (for example, the UEs 102, 106, and the base station 104 of FIG. 1) implementing the life cycle management using model ID and model function.

At 602, the UE 102 trains one or more AI models. In some aspects, the one or more AI models can be one-sided AI models used by the UE 102. In some aspects, the one or more AI models can correspond to one or more model functions. For example, the one or more model functions can include CSI prediction, spatial domain beam prediction, channel line-of-sight (LoS) classification, and so on. The one or more AI models can include a first set of AI models corresponding to the CSI prediction, a second set of AI models corresponding to the spatial domain beam prediction, a third set of AI models corresponding to the LoS classification, and/or other AI models.

At 604, the UE 102 reports capability to the base station 104. The capability can indicate the one or more model functions. For example, the capability can include the CSI prediction and the spatial domain beam prediction.

At 606, the base station 104 generates and transmits an activation message to the UE 102. The activation message can indicate a model function indicated by the UE 102 in the capability report. For example, the activation message can indicate the CSI prediction model function.

At 608, the base station 104 can transmit a performance requirement to the UE 102. In some aspects, the performance requirement can include one or more signal qualities to be monitored at step 614. For example, the signal qualities can include an SNR, a signal strength, a BER, and other matrices. In addition, the performance requirement can indicate predetermined threshold values. For example, the performance requirement can indicate an SNR threshold.

At 610, the UE 102 activates an AI model corresponding to the model function indicated in the activation message. For example, when the activation message indicates the CSI prediction model function, the UE 102 activates an AI model of the first set of AI models corresponding to the CSI prediction model function. In some aspects, AI models of the first set of AI models may serve different scenarios. For example, the first set of AI models can include a first AI model serving an indoor scenario and a second AI model serving an outdoor scenario. The UE 102 can autonomously select an AI model from the first set of AI models. For example, the UE 102 may determine that the UE 102 is currently indoor and thus select and activate the first AI model from the first set of AI models.

At 612, the UE 102 performs a task using the activated AI model at 610, such as the first AI model. For example, the UE 102 can perform CSI prediction inferencing using the first AI model.

At 614, the UE 102 monitors performance. For example, the UE 102 can monitor a signal quality of signals received from the base station 104. The signal quality can include an SNR, a signal strength, a BER, a latency value, and so on. In some aspects, the UE 102 can determine whether the signal quality satisfies the performance requirement received at 608. For example, the signal quality can be the SNR and the performance requirement can be the SNR threshold.

In some aspects, the UE 102 may determine that the SNR of the received signal is below the SNR threshold indicated in the performance requirement. In such a case, the UE 102 can autonomously switch to another AI model. For example, the UE 102 can determine that the UE 102 is now outdoor. In such a case, the UE 102 can switch to the second AI model to perform the CSI prediction outdoor. The control then moves back to 612 to perform CSI prediction using the second AI model.

In other aspects, the UE 102 may determine that no other AI model can satisfy the performance requirement. For example, the UE 102 may determine that the second AI model still cannot satisfy the performance requirement, e.g., obtain an SNR that is higher than the minimum SNR. For another example, the UE 102 may train only one AI model for the CSI prediction model function, i.e., the first AI model function. Thus, there is no alternative AI models for the UE 102 to switch to for the CSI prediction model function. In either case, the control moves to 616.

At 616, the UE 102 transmits an action request to the base station 104. The action request can indicate deactivation of the model function, such as the CSI prediction model function. The action request can also indicate switching to another model function, such as the spatial domain beam prediction model function or the channel LoS classification model function. The action request can also indicate falling back to default functions without using AI models. In some aspects, the UE 102 can transmit the action request via UAI or uplink MAC CE to the base station 104.

At 618, the UE 102 receives action confirmation from the base station 104. The action confirmation configures the UE 102 to deactivate the model function, such as the CSI prediction model function. The action confirmation can also configure the UE 102 to switch to another model function or fall back to default functions without using AI models.

At 620, the UE 102 takes an action based on the action confirmation. For example, the UE 102 can deactivate the CSI prediction model function or switch to another model function. The UE 102 can also fall back to default functions without using AI models.

Figure 7:
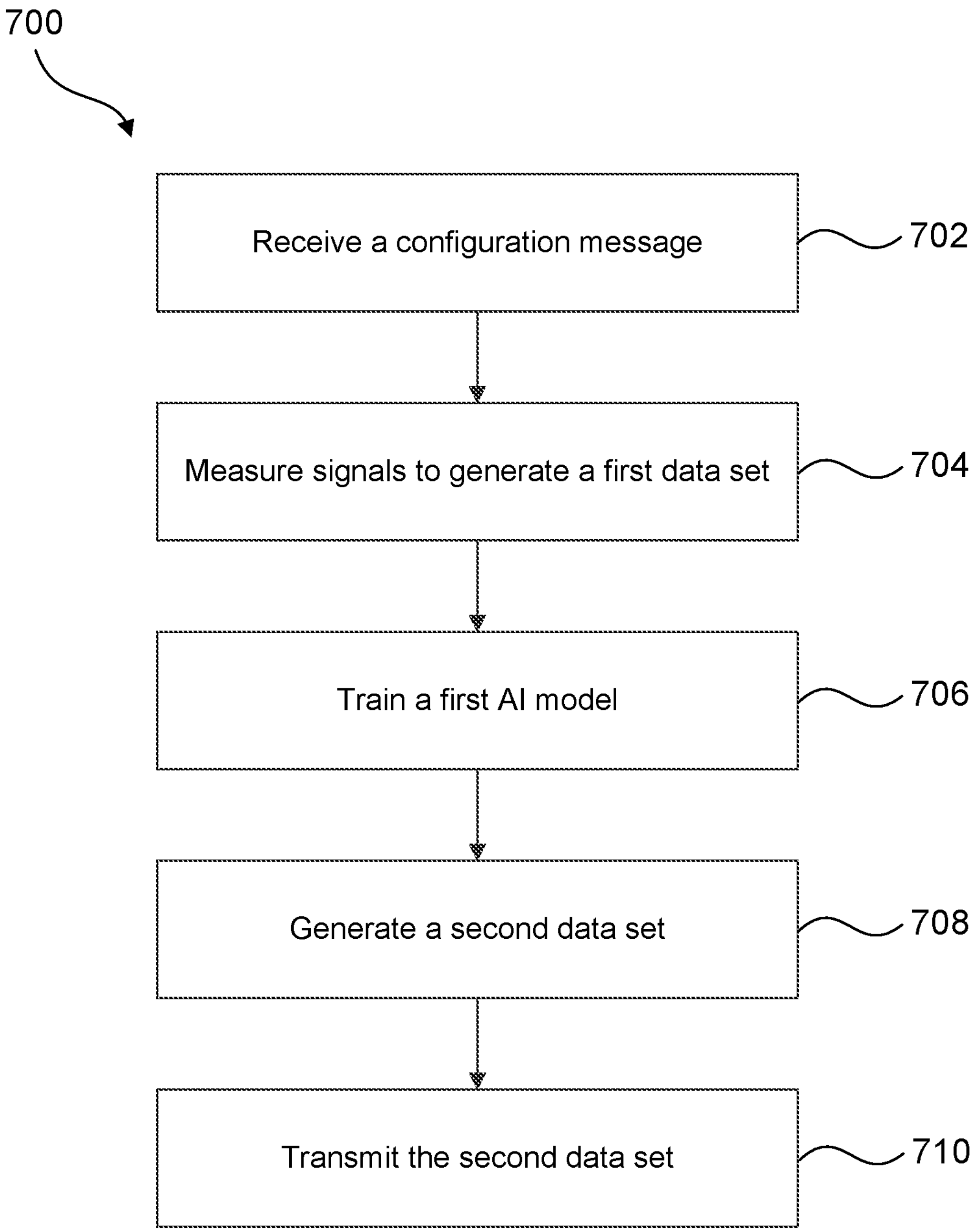
FIG. 7 illustrates an example method of training a two-sided AI model at a UE, according to aspects of the disclosure.

FIG. 7 illustrates an example method 700 of training a two-sided AI model at a UE, according to aspects of the disclosure. The example method 700 is provided for the purpose of illustration only and does not limit the disclosed aspects. As a convenience and not a limitation, FIG. 7 may be described with regard to elements of FIGS. 1, 2, and 9. The example method 700 may represent the operation of electronic devices (for example, the UEs 102, 106, and the base station 104 of FIG. 1) implementing the life cycle management using model ID and model function.

At 702, a UE, such as the UE 102, receives a configuration message from a base station, such as the base station 104. The configuration message indicates a model ID and one or more signals. The one or more signals can be CSI-RS.

At 704, the UE measures the one or more signals to generate a data set corresponding to the model ID. For example, the UE can measure CSI-RS received from the base station to generate the data set. The UE can also label the data set using the model ID.

At 706, the UE trains a first AI model corresponding to the model ID using the data set. For example, the first AI model can be a part of a two-sided AI model. The model ID corresponds to the two-sided AI model and thus also corresponds to the first AI model.

At 708, the UE generates a second data set corresponding the model ID. In some aspects, the second data set can be based on the first data set. For example, UE can generate the second data set using the first AI model. In some aspects, the second data set can be used to train a second AI model. In some aspects, the second AI model can be a part of the two-sided AI model and thus also corresponds to the model ID.

At 710, the UE transmits the second data set and the model ID to the base station. The second data set enables the base station to train the second AI model corresponding to the model ID.

Figure 8:
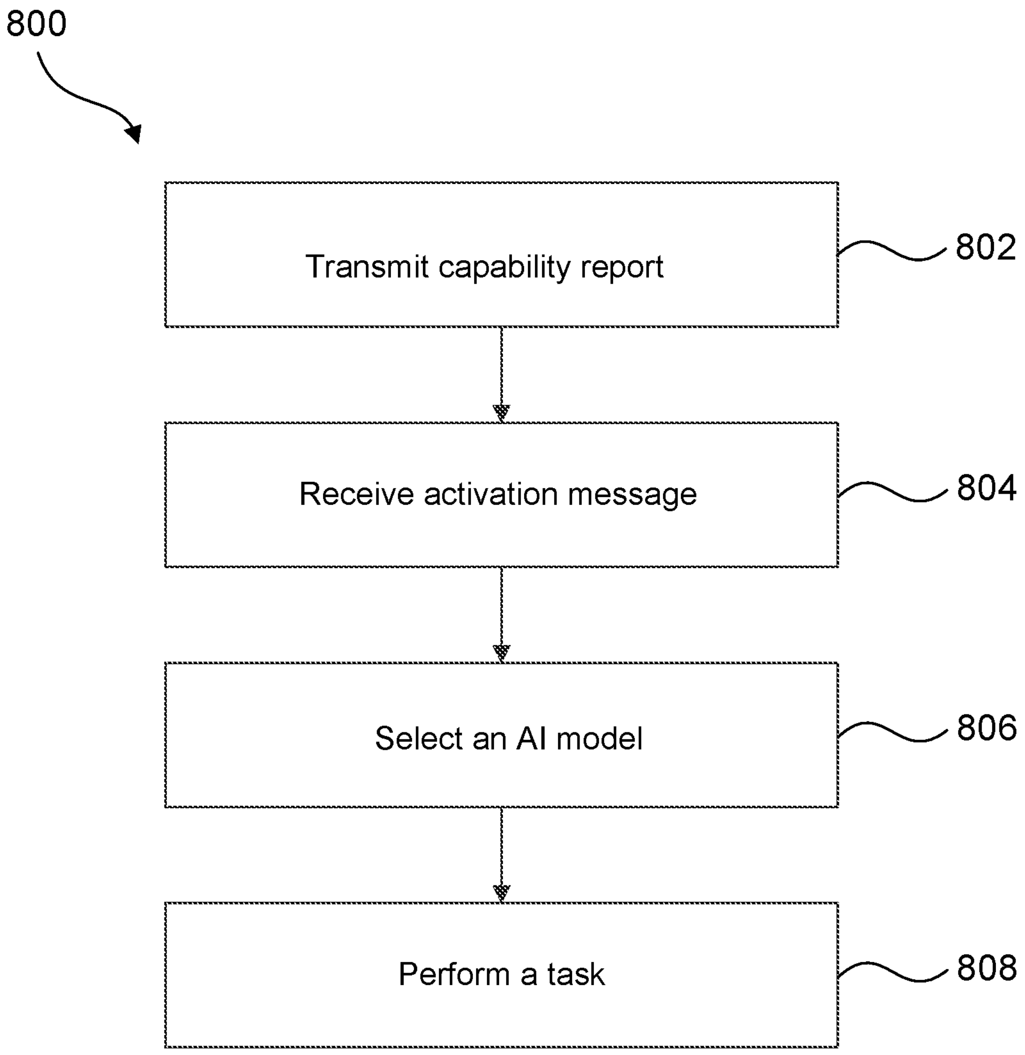
FIG. 8 illustrates an example method of requesting and using an AI model at a UE, according to aspects of the disclosure.

FIG. 8 illustrates an example method 800 of requesting and using an AI model at a UE, according to aspects of the disclosure. The example method 800 is provided for the purpose of illustration only and does not limit the disclosed aspects. As a convenience and not a limitation, FIG. 8 may be described with regard to elements of FIGS. 1, 2, and 9. The example method 800 may represent the operation of electronic devices (for example, the UEs 102, 106, and the base station 104 of FIG. 1) implementing the life cycle management using model ID and model function.

At 802, a UE, such as the UE 102, transmits a capability report to a base station, such as the base station 104. The capability report can indicate one or more model functions. The one or more model functions can include a CSI prediction model function, a spatial domain beam prediction model functions, a channel LoS classification model function, and so on. In some aspects, the UE 102 has trained one or more AI models of the one or more model functions.

At 804, the UE receives an activation message from the base station. The activation message can indicate a model function of the one or more model functions. For example, the model function can be the CSI prediction model function.

At 806, the UE selects an AI model from the one or more AI models corresponding to the model function. For example, the one or more AI models may correspond to different scenarios. The one or more AI models may include a first AI model corresponding to an indoor scenario and a second AI model corresponding to an outdoor scenario. The UE may determine that the UE is currently indoor and thus select the first AI model.

At 808, the UE performs a task using the AI model of the one or more AI models. For example, the UE can perform CSI prediction using the first AI model.

Figure 9:
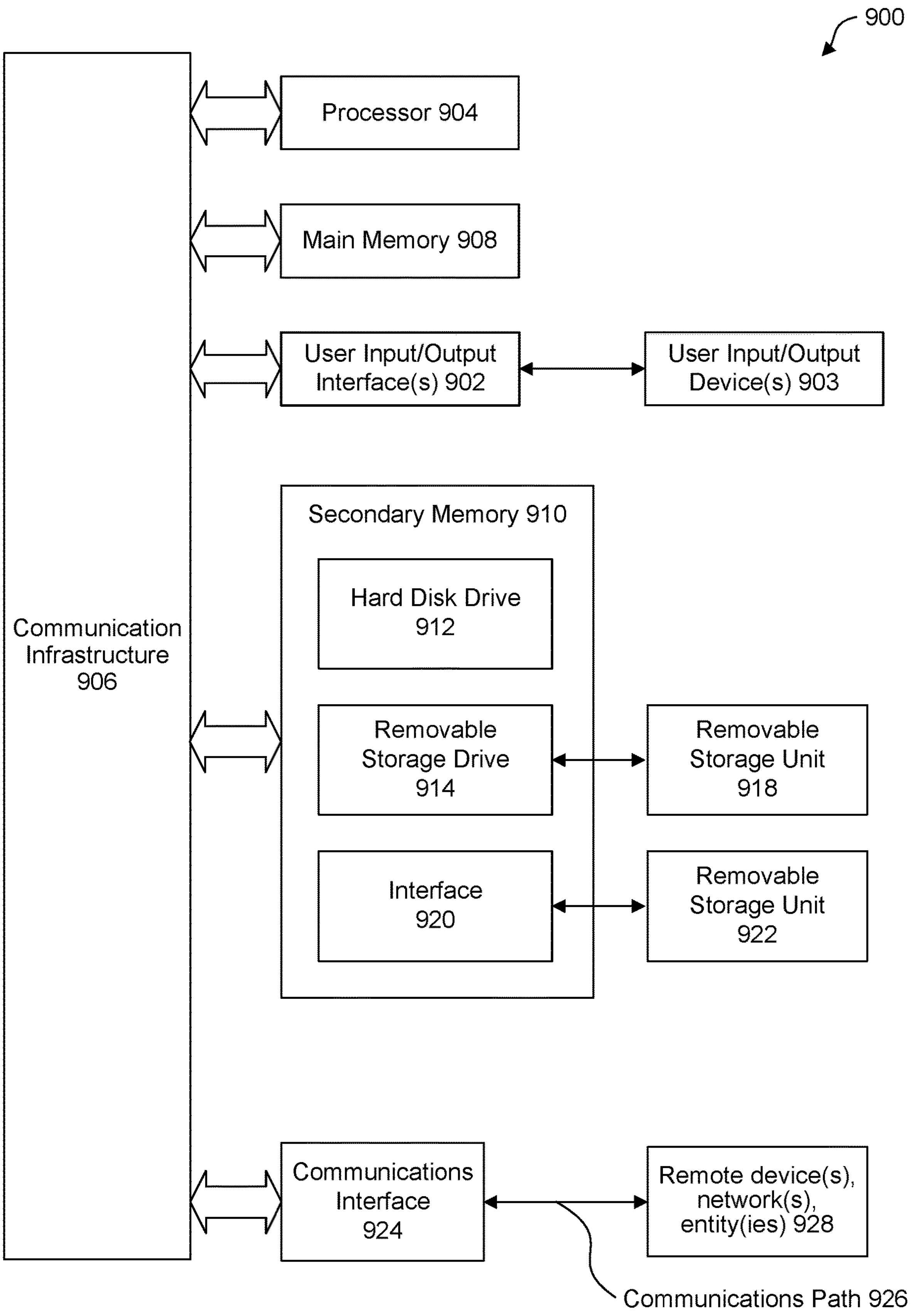
FIG. 9 is an example computer system for implementing some aspects of the disclosure or portion(s) thereof.

Various aspects can be implemented, for example, using one or more computer systems, such as computer system 900 shown in FIG. 9. Computer system 900 can be any well-known computer capable of performing the functions described herein such as devices 102, 104, and 106 of FIG. 1, or 200 of FIG. 2. Computer system 900 includes one or more processors (also called central processing units, or CPUs), such as a processor 904. Processor 904 is connected to a communication infrastructure 906 (e.g., a bus.) Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some aspects, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 9. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE) comprising:
- a transceiver configured to enable wireless communications with a base station; and
- a processor, communicatively coupled to the transceiver, and configured to:
  - receive, using the transceiver, a configuration message from the base station, wherein the configuration message comprises a model identification (ID) and indicates one or more signals corresponding to the model ID;
  - measure, using the transceiver, the one or more signals to generate a data set corresponding to the model ID;
  - train a first artificial intelligence (AI) model corresponding to the model ID using the data set;
  - generate a second data set corresponding to the model ID; and
  - transmit, using the transceiver, the second data set labeled using the model ID and the model ID to the base station, wherein the second data set enables a second AI model corresponding to the model ID to be trained at the base station.

2. The UE of claim 1, wherein the first AI model and the second AI model are parts of a two-sided AI model corresponding to the model ID.

3. The UE of claim 1, wherein the one or more signals include a channel state information reference signal (CSI-RS).

4. The UE of claim 1, wherein the processor is further configured to:
- transmit, using the transceiver, a capability report to the base station,
- wherein the capability report indicates a two sided model including the first AI model and the second AI mode.

5. The UE of claim 1, wherein the processor is further configured to:
- receive, using the transceiver, an activation message that indicates the model ID; and
- activate, based on the activation message, the first AI model to perform a task.

6. The UE of claim 5, wherein the task includes:
- channel state information (CSI) compression.

7. The UE of claim 1, wherein the processor is further configured to:
- monitor a signal quality of signals received from the base station;
- determine that the signal quality is below a predetermine threshold;
- transmit an action request to the base station; and
- receive an action confirmation from the base station.

8. The UE of claim 7, wherein the action request indicates:
- a deactivation the first AI model and the second AI model;
- a switch to other AI models; or
- a falling back to a default.

9. A method of operating a user equipment (UE) comprising:
- receiving a configuration message from a base station, wherein the configuration message comprises a model identification (ID) and indicates one or more signals corresponding to the model ID;

measuring the one or more signals to generate a data set corresponding to the model ID;

training a first artificial intelligence (AI) model corresponding to the model ID using the data set;

generating a second data set corresponding to the model ID; and transmitting the second data set and the model ID labeled using the model ID to the base station, wherein the second data set enables a second AI model corresponding to the model ID to be trained at the base station.

10. The method of claim 9, wherein the first AI model and the second AI model are parts of a two-sided AI model corresponding to the model ID.

11. The method of claim 9, wherein the one or more signals include a channel state information reference signal (CSI-RS).

12. The method of claim 9, further comprising:

transmitting a capability report to the base station, wherein the capability report indicates a two sided model including the first AI model and the second AI mode.

13. The method of claim 9, further comprising:

receiving an activation message that indicates the model ID; and activating, based on the activation message, the first AI model to perform a task.

14. The method of claim 13, wherein the task includes: channel state information (CSI) compression.

15. The method of claim 9, further comprising:

monitoring a signal quality of signals received from the base station;

determining that the signal quality is below a predetermine threshold;

transmitting an action request to the base station; and receiving an action confirmation from the base station.

16. The method of claim 15, wherein the action request indicates:

deactivating the first AI model and the second AI model;

switching to other AI models; or falling back to a default method.

17. A user equipment (UE) comprising:

a transceiver configured to enable wireless communications with a base station; and a processor, communicatively coupled to the transceiver, and configured to:

transmit, using the transceiver, a capability report to the base station, wherein the capability report indicates one or more model functions, wherein the one or more model functions include:

channel state information (CSI) prediction module function, spatial domain beam prediction model function, or channel line-of-sight (LoS) classification module function;

receive, using the transceiver, an activation message from the base station, wherein the activation message indicates a model function of the one or more model functions;

select an artificial intelligence (AI) model from one or more AI models corresponding to the model function; and perform a task using the AI model.

18. The UE of claim 17, wherein the processor is further configured to:

monitor a signal quality of signals received from the base station;

determine that the signal quality is below a predetermine threshold;

transmit an action request to the base station; and receive an action confirmation from the base station.

19. The UE of claim 18, wherein the action request indicates to:

deactivate the model function;

switch to another model function; or fall back to a default.

20. The method of claim 17, wherein the task includes channel state information (CSI) compression.

* * * * *